US008579518B2

(12) United States Patent
Isenhour et al.

(10) Patent No.: US 8,579,518 B2
(45) Date of Patent: Nov. 12, 2013

(54) OPTICAL RECEPTACLES AND SYSTEMS AND DEVICES INCLUDING OPTICAL RECEPTACLES

(75) Inventors: Micah Colen Isenhour, Lincolnton, NC (US); Dennis Michael Knecht, Hickory, NC (US); James Phillip Luther, Hickory, NC (US)

(73) Assignee: Corning Incorporated, Corning, NY (US)

( * ) Notice: Subject to any disclaimer, the term of this patent is extended or adjusted under 35 U.S.C. 154(b) by 268 days.

(21) Appl. No.: 12/951,288

(22) Filed: Nov. 22, 2010

(65) Prior Publication Data

US 2011/0229094 A1    Sep. 22, 2011

Related U.S. Application Data

(60) Provisional application No. 61/315,421, filed on Mar. 19, 2010.

(51) Int. Cl.
*G02B 6/38* (2006.01)
*G02B 6/36* (2006.01)

(52) U.S. Cl.
USPC .......... 385/75; 385/55; 385/56; 385/58; 385/60; 385/70; 385/72; 385/76; 385/77; 385/78; 385/85

(58) Field of Classification Search
USPC .......................... 385/58, 70, 75, 85
See application file for complete search history.

(56) References Cited

U.S. PATENT DOCUMENTS

| | | | |
|---|---|---|---|
| 4,557,554 A | 12/1985 | Blanc | 350/96.2 |
| 4,726,646 A | 2/1988 | Tanaka et al. | 350/96.2 |
| 4,730,885 A | 3/1988 | Doi | 350/96.15 |
| 4,738,506 A | 4/1988 | Abendschein et al. | 385/96.2 |
| 4,755,415 A | 7/1988 | Iijima et al. | 428/163 |
| 5,202,943 A | 4/1993 | Carden et al. | 385/92 |
| 5,317,485 A | 5/1994 | Merjanian | 362/32 |

(Continued)

FOREIGN PATENT DOCUMENTS

| | | |
|---|---|---|
| EP | 0838702 A1 | 4/1998 |
| EP | 1925958 A1 | 5/2008 |

(Continued)

OTHER PUBLICATIONS

International Preliminary Report on Patentability relating to PCT/US2011/028935, Mail Date: Sep. 25, 2012.

(Continued)

*Primary Examiner* — Ryan Lepisto (57) ABSTRACT

According to one embodiment, an optical receptacle for receiving a corresponding optical connector may include a receptacle housing, a receptacle optical path and a positionable shutter assembly. The receptacle housing includes a connector port disposed at an end of the receptacle housing and a receptacle pathway. The connector port may receive the corresponding optical connector. The receptacle optical path may terminate within the receptacle housing and includes an optical waveguide. The positionable shutter assembly includes a cleaning member positioned on a support surface of the positionable shutter assembly. The positionable shutter assembly may be biased to the closed position such that the cleaning member contacts or is proximate to the optical waveguide and the positionable shutter assembly is disposed in the receptacle pathway. The positionable shutter assembly may be biased to the open position such that the cleaning member is not positioned over the receptacle optical path.

16 Claims, 7 Drawing Sheets

(56) References Cited

U.S. PATENT DOCUMENTS

| | | | |
|---|---|---|---|
| 5,329,604 A | 7/1994 | Baldwin et al. | 385/92 |
| 5,687,268 A | 11/1997 | Stephenson et al. | 385/73 |
| 5,940,560 A * | 8/1999 | De Marchi et al. | 385/58 |
| 6,079,881 A | 6/2000 | Roth | 385/76 |
| 6,081,647 A | 6/2000 | Roth et al. | 385/139 |
| 6,108,482 A | 8/2000 | Roth | 385/139 |
| 6,179,479 B1 | 1/2001 | Crivelli | 385/73 |
| 6,206,577 B1 | 3/2001 | Hall, III et al. | 385/53 |
| 6,264,374 B1 | 7/2001 | Selfridge et al. | 385/78 |
| 6,340,246 B1 | 1/2002 | Yoshida et al. | 385/73 |
| 6,352,375 B1 | 3/2002 | Shimoji et al. | 385/92 |
| 6,425,694 B1 | 7/2002 | Szilagyi et al. | 385/76 |
| 6,461,054 B1 | 10/2002 | Iwase | 385/73 |
| 6,471,412 B1 | 10/2002 | Belenkiy et al. | 385/53 |
| 6,511,229 B2 | 1/2003 | Kiani | 385/53 |
| 6,572,274 B1 | 6/2003 | Margaliot et al. | 385/75 |
| 6,595,696 B1 | 7/2003 | Zellak | 385/72 |
| 6,652,152 B2 | 11/2003 | Yang et al. | 385/53 |
| 6,688,780 B2 | 2/2004 | Duran | 385/76 |
| 6,715,930 B2 | 4/2004 | McBride | 385/73 |
| 6,764,222 B1 | 7/2004 | Szilagyi et al. | 385/55 |
| 6,775,459 B2 | 8/2004 | Hong et al. | 385/140 |
| 6,793,399 B1 | 9/2004 | Nguyen | 385/53 |
| 6,793,402 B2 | 9/2004 | Uchida | 385/76 |
| 6,796,719 B2 | 9/2004 | Zhu et al. | 385/76 |
| 6,845,210 B2 | 1/2005 | Ohbayashi et al. | 385/139 |
| 6,866,424 B2 | 3/2005 | Tanaka et al. | 385/55 |
| 6,945,705 B2 | 9/2005 | Takeda et al. | 385/77 |
| 6,965,720 B2 | 11/2005 | Melnyk et al. | 385/134 |
| 6,984,075 B2 | 1/2006 | Satoh | 385/92 |
| 6,988,836 B2 | 1/2006 | Wang | 385/92 |
| 7,025,609 B2 | 4/2006 | Matsumoto et al. | 439/138 |
| 7,086,878 B2 | 8/2006 | Mine et al. | 439/137 |
| 7,114,856 B2 | 10/2006 | Ohbayashi et al. | 385/88 |
| 7,144,163 B2 | 12/2006 | Tanaka et al. | 385/75 |
| 7,153,041 B2 | 12/2006 | Mine et al. | 385/92 |
| 7,261,471 B2 | 8/2007 | Tsuchida et al. | 385/70 |
| 7,331,718 B2 | 2/2008 | Yazaki et al. | 385/78 |
| 7,419,310 B2 | 9/2008 | Mizuno | 385/88 |
| 7,559,700 B2 | 7/2009 | Eguchi et al. | 385/70 |
| 7,785,018 B2 | 8/2010 | Jones et al. | 385/73 |
| 7,806,599 B2 | 10/2010 | Margolin et al. | 385/75 |
| 7,837,395 B2 | 11/2010 | Lin et al. | 385/58 |
| 7,841,777 B2 | 11/2010 | Howard et al. | 385/75 |
| 2003/0169991 A1 * | 9/2003 | Malevanets et al. | 385/134 |
| 2008/0273842 A1 * | 11/2008 | Tanaka et al. | 385/90 |

FOREIGN PATENT DOCUMENTS

| | | |
|---|---|---|
| JP | 53141644 A | 12/1978 |
| JP | 2005062580 A | 3/2005 |
| WO | 2006/086153 A1 | 8/2006 |

OTHER PUBLICATIONS

International Search Report relating to PCT/US2011/028935, Mail Date: Sep. 8, 2011.
European Communication pursuant to Rules 161(1) and 162 EPC relating to EP Patent Application No. 11710390.3; Mail Date: Feb. 11, 2012.
"Fiber optic connector with built-in shutter", Research Disclosure, Mason Publications, Hampshite GB. vol. 275, No. 6, Mar. 1, 1987.

* cited by examiner

OPTICAL RECEPTACLES AND SYSTEMS AND DEVICES INCLUDING OPTICAL RECEPTACLES

CROSS REFERENCE TO RELATED APPLICATIONS

This patent application claims the benefit of U.S. Provisional Application No. 61/315,421 filed Mar. 19, 2010 entitled "Integrated Cleaning Method for Use in Small Form Consumer Electronics Applications, And an Optical Device," the entirety of which is incorporated herein by reference.

BACKGROUND

1. Field

The present specification generally relates to optical receptacles and, more specifically, to optical receptacles including a shutter assembly for cleaning an optical waveguide, and systems and devices incorporating the same.

2. Technical Background

Optical waveguides are commonly connected to other optical waveguides via a mechanical coupling that aligns the optical waveguides to enable the transmission of light through the optical waveguides. For example, the optical waveguides may terminate at a polished end surface. The mechanical coupling may be made by pressing together the respective polished end surfaces resulting in a direct surface to surface contact (e.g., glass to glass or plastic to plastic contact). The direct surface to surface contact reduces the magnitude of connection losses due to discontinuity between optical waveguides.

As the use of optical waveguides increases in applications such as cellular phones or small computers (e.g., laptops, netbooks and tablets), the probability that end surface may be exposed to environments with contaminants such as, for example, dirt increases. The need to ameliorate the possible contamination of optical waveguides due to dirt is becoming increasingly important.

Accordingly, a need exists for alternative optical receptacles comprising a shutter assembly for cleaning an optical waveguide.

SUMMARY

According to one embodiment, an optical receptacle for receiving a corresponding optical connector may include a receptacle housing, a receptacle optical path and a positionable shutter assembly. The receptacle housing includes a connector port disposed at an end of the receptacle housing and a receptacle pathway disposed within the receptacle housing. The connector port may receive the corresponding optical connector. The receptacle optical path may terminate within the receptacle housing and includes an optical waveguide. The positionable shutter assembly has a closed position and an open position with respect to the receptacle optical path. The positionable shutter assembly includes a cleaning member positioned on a support surface of the positionable shutter assembly. When the corresponding optical connector is not positioned in the receptacle pathway, the positionable shutter assembly may be biased to the closed position such that the cleaning member contacts or is proximate to the optical waveguide and the positionable shutter assembly is disposed in the receptacle pathway. When the corresponding optical connector is positioned in the receptacle pathway, the positionable shutter assembly may be biased to the open position such that the cleaning member is not positioned over the receptacle optical path.

In another embodiment, an optical connection system may include an optical receptacle and a corresponding optical connector. The optical receptacle may include a receptacle housing, a receptacle optical path and a positionable shutter assembly. The receptacle housing includes a connector port disposed at an end of the receptacle housing and a receptacle pathway extending from the connector port. The connector port may receive the corresponding optical connector. The receptacle optical path may terminate within the receptacle housing and include an optical waveguide. The positionable shutter assembly includes a cleaning member positioned on a support surface of the positionable shutter assembly. The corresponding optical connector may include an optical connector housing and a connector optical path. When the corresponding optical connector is not positioned in the receptacle pathway, the positionable shutter assembly may be biased to a closed position such that the cleaning member contacts or is proximate to the optical waveguide. When the corresponding optical connector is positioned in the receptacle pathway, the receptacle optical path and the connector optical path may be in optical communication and the optical connector housing may be engaged with the positionable shutter assembly such that the positionable shutter assembly is biased to an open position and the cleaning member is not positioned over the receptacle optical path.

In yet another embodiment, a consumer electronic device may include a housing containing at least one optical circuit and an optical receptacle disposed within the housing. The optical receptacle may include a receptacle housing, a receptacle optical path, and a positionable shutter assembly. The receptacle housing includes a connector port disposed at an end of the receptacle housing, and a receptacle pathway extending from the connector port. The connector port may receive a corresponding optical connector. The receptacle optical path may terminate within the receptacle housing and include an optical waveguide optically coupled to the at least one optical circuit. The positionable shutter assembly has a closed position and an open position with respect to the receptacle optical path. The positionable shutter assembly includes a cleaning member positioned on a support surface of the positionable shutter assembly. When the corresponding optical connector is not positioned in the receptacle pathway, the positionable shutter assembly may be biased to the closed position such that the cleaning member contacts or is proximate to the optical waveguide. When the corresponding optical connector is positioned in the receptacle pathway, the positionable shutter assembly may be biased to the open position such that the cleaning member is not positioned over the receptacle optical path.

In a further embodiment, an optical receptacle for receiving a corresponding optical connector may include a receptacle housing, a receptacle optical path, and a positionable shutter assembly. The receptacle housing includes a connector port forming an aperture in the receptacle housing. The connector port may receive the corresponding optical connector. The receptacle optical path may terminate within the receptacle housing. The receptacle optical path includes an optical waveguide. The positionable shutter assembly has a closed position and an open position with respect to the connector port. The positionable shutter assembly includes a cleaning member positioned on a support surface of the positionable shutter assembly. When the positionable shutter assembly is biased to the closed position, the cleaning member may contact or may be proximate to the optical waveguide and the positionable shutter assembly may cover the connector port. When the positionable shutter assembly is biased to the open position, the cleaning member is not positioned over the receptacle optical path and the positionable shutter assembly may be adjacent to the connector port such that at least a portion of the connector port is unobstructed.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION OF THE PREFERRED EMBODIMENTS

Figure 1:
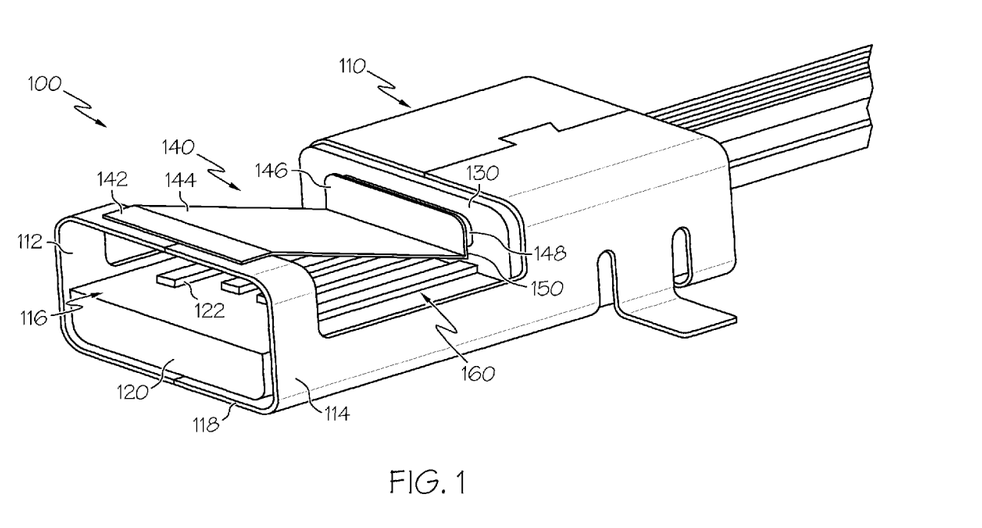
FIG. 1 schematically depicts an optical receptacle with a shutter in an open position according to one or more embodiments shown and described herein.

Reference will now be made in detail to embodiments of the present disclosure, examples of which are illustrated in the accompanying drawings. Whenever possible, the same reference numerals will be used throughout the drawings to refer to the same or like parts. One embodiment of the optical receptacle of the present disclosure is depicted in FIG. 1, and is designated generally throughout by the reference numeral 100. The optical receptacle for receiving a corresponding optical connecter generally includes a receptacle housing, a receptacle optical path, and a positionable shutter assembly with a cleaning member. Embodiments of the optical receptacle, as well as optical connection systems and consumer electronic devices including optical receptacles are described in more detail herein.

Referring now to FIG. 1, the receptacle housing 110 is a structural member that generally defines the shape of optical receptacle 100. It is noted that, while the shape of the receptacle housing 110 is depicted in FIGS. 1-4B as being substantially box-shaped, the shape may be altered to accommodate any interface standard such as, for example, USB 1.0, USB 2.0, USB 3.0, SATA, IEEE 1394, or any other known or yet to be developed interface standard.

In the embodiments described herein, the receptacle housing 110 may comprise an inner surface 112, an outer surface 114, a receptacle pathway 116 and a connector port 118. The inner surface 112 at least partially surrounds and at least partially defines a receptacle pathway 116. The connector port 118 is disposed at an end of the receptacle housing 110. The connector port 118 receives a corresponding optical connector 170 (FIG. 2B) as it is inserted into the receptacle pathway 116. The receptacle housing 110 may be formed of metal or any other material described in a corresponding interface standard.

Figure 2A:
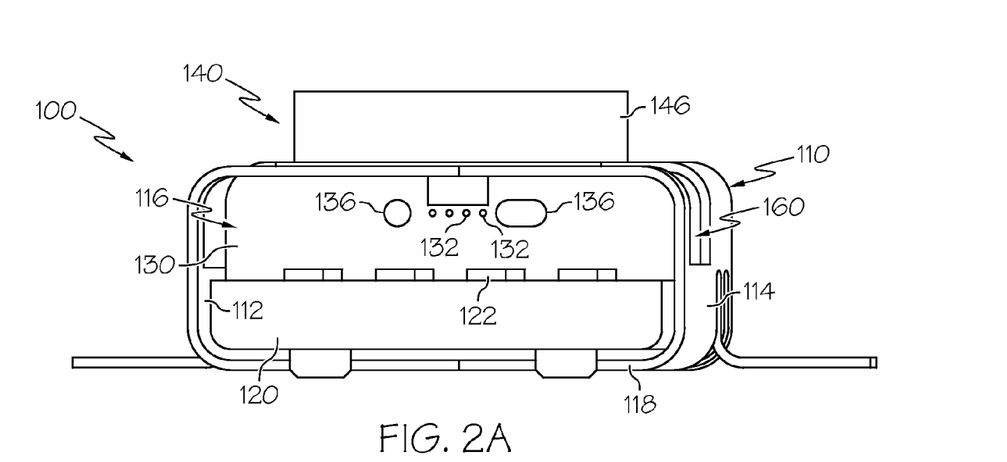
FIG. 2A schematically depicts an optical receptacle with a shutter in an open position according to one or more embodiments shown and described herein.

Referring now to FIG. 2A, embodiments of the optical receptacle 100 comprise one or more receptacle optical paths 132 for the communication of optical data. Each receptacle optical path 132 comprises an optical waveguide that transmits optical data. The optical waveguide may include any material that transmits light such as, but not limited to, a cylindrically shaped glass or polymer material (i.e., an optical fiber) that transmits light along its axis. The optical data is transmitted via the receptacle optical path 132, which terminates within the receptacle housing 110. Specifically, the receptacle optical path 132 may terminate within receptacle pathway 116 or adjacent to the receptacle pathway 116. In one embodiment, the receptacle optical path 132 extends through a mating wall 130 disposed within the connector housing. The mating wall 130 is spaced apart from the connector port 118 at an end of the receptacle pathway 116. In another embodiment, the optical receptacle 100 comprises an active element (not depicted) disposed within the receptacle housing 110 for generating an optical signal. The active element may be any device that converts electrical energy to optical energy such as, for example, a light source or an optical amplifier.

Figure 3A:
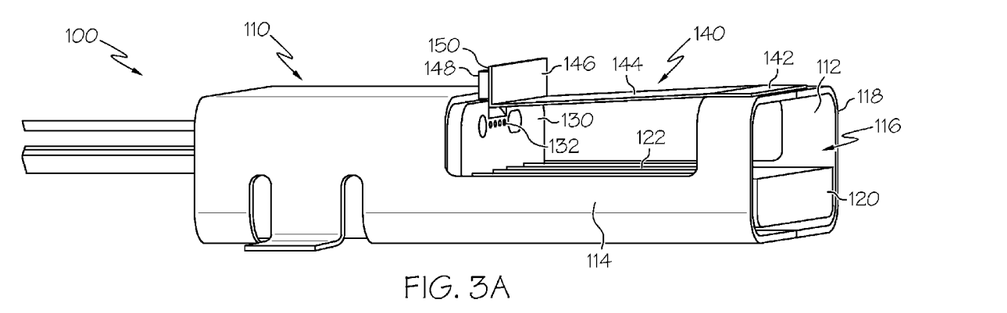
FIG. 3A schematically depicts an optical receptacle with a shutter in an open position according to one or more embodiments shown and described herein.

Referring now to FIG. 3A, the optical receptacle 100 comprises a positionable shutter assembly 140 for cleaning the optical waveguide. The positionable shutter assembly 140 comprises a cleaning member 148 disposed on a support surface 150 of the positionable shutter assembly 140. Specifically, the cleaning member 148 may comprise a lens cleaning material such as, for example, a fibrous material, a spongy material, a foam material, and the like. In some embodiments, the lens cleaning material may further comprise a cleaning solution suitable for use with optical waveguides. The cleaning member 148 may be removably received on the support surface 150 of the positionable shutter assembly 140, i.e., the cleaning member 148 may be temporarily fastened such that the cleaning member 148 may be replaced periodically throughout the life of the optical receptacle 100. In further embodiments, the support surface 150 of the positionable shutter assembly 140 is substantially planar, i.e., a relatively flat surface.

Figure 3B:
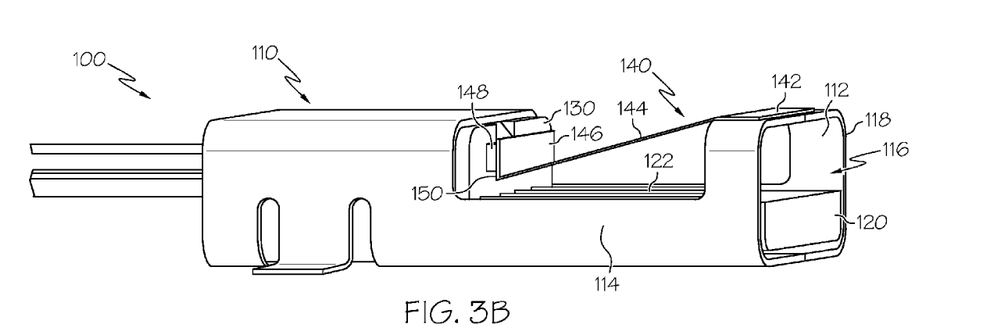
FIG. 3B schematically depicts an optical receptacle with a shutter in a closed position according to one or more embodiments shown and described herein.

Referring collectively to FIGS. 3A and 3B, the optical waveguide positioned in the receptacle optical path 132 may be cleaned as the positionable shutter assembly 140 transitions between an open position (FIG. 3A) and a closed position (FIG. 3B) with respect to the receptacle optical path 132. In one embodiment, the positionable shutter assembly 140 comprises a coupling member 142, a connector engagement portion 144 and a shutter portion 146. The coupling member 142 is coupled to the outer surface 114 of the receptacle housing 110. The coupling member 142 may be coupled to the receptacle housing 110 via a mechanical coupling such as, for example, an adhesive, a weld, a bolt, a screw, a rivet and the like. The coupling member 142 may also be integral with the receptacle housing 110. The connector engagement portion 144 extends from the coupling member 142. Specifically, the connector engagement portion 144 may be cantilevered and extend through a cutout 160 in the receptacle housing 110. The shutter portion 146 extends from the connector engagement portion 144. The shutter portion 146 comprises the support surface 150 upon which the cleaning member is positioned. The positionable shutter assembly 140 may comprise any elastically deformable and recoverable material such as, for example, metal, plastic and the like.

The positionable shutter assembly 140 is elastically deformable between the closed position (FIG. 3B) and the open position (FIG. 3A). For example, as depicted in FIG. 3B, the connector engagement portion 144 is initially biased to the closed position. When the positionable shutter assembly 140 is in the closed position, the connector engagement portion 144 at least partially obstructs the receptacle pathway and the cleaning member 148 is in contact with a surface of the optical waveguide. The optical waveguide is cleaned by inserting a corresponding optical connector 170 (FIG. 2B) which contacts the connector engagement portion 144 and biases the connector engagement portion 144 to the open position. For example, the corresponding optical connector 170 may be received by the optical receptacle 100. As the corresponding optical connector 170 is urged through the connector port 118 and into receptacle pathway 116, the connector engagement portion 144 resists the motion of the corresponding optical connector 170. The resistance may be overcome by elastically deforming the positionable shutter assembly 140 with the corresponding optical connector 170. As the positionable shutter assembly 140 is deformed, the positionable shutter assembly 140 is displaced toward the inner surface 112 of the receptacle housing 110, i.e., a direction in opposition to the elastic force that biases the positionable shutter assembly 140 to the closed position. The corresponding optical connector 170 may traverse the receptacle pathway 116 and engage the connector engagement portion 144 to bias the positionable shutter assembly 140 to the open position.

Figure 4A:
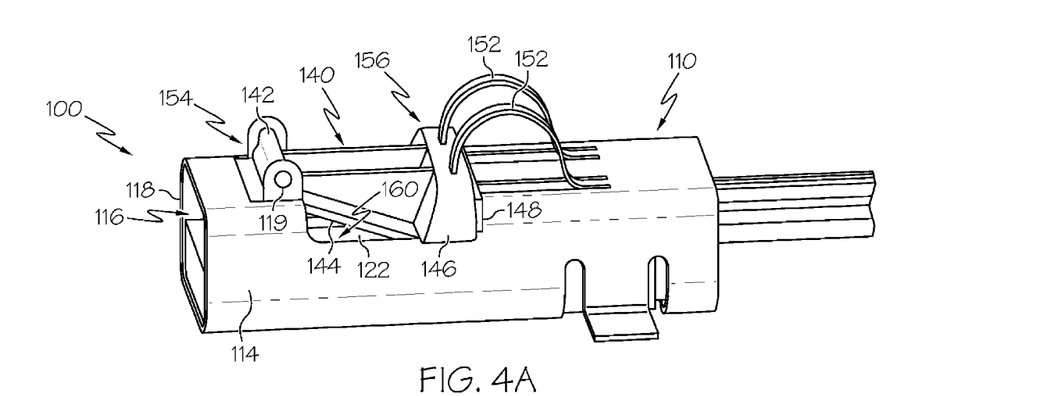
FIG. 4A schematically depicts an optical receptacle with a shutter in a closed position according to one or more embodiments shown and described herein.
Figure 4B:
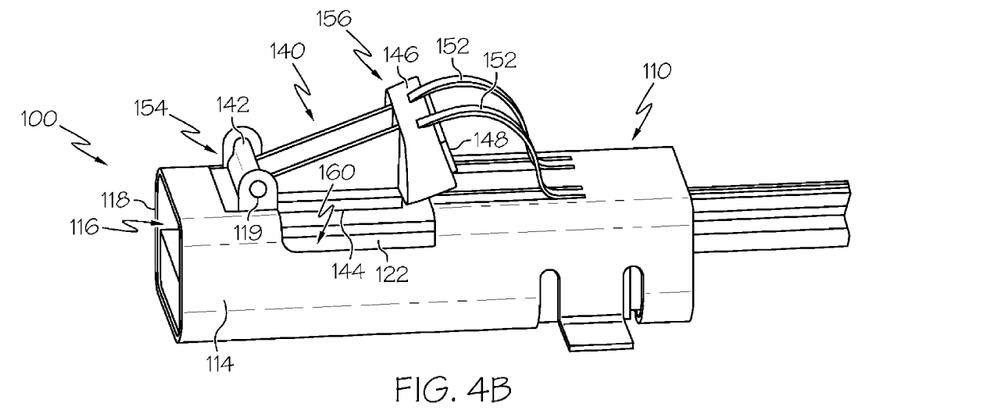
FIG. 4B schematically depicts an optical receptacle with a shutter in an open position according to one or more embodiments shown and described herein.

In another embodiment, depicted in FIGS. 4A and 4B, the connector engagement portion 144 of the positionable shutter assembly 140 comprises a coupling end 154 and a shutter end 156. A spring element 152 may couple the receptacle housing 110 to the shutter end 156 of the connector engagement portion 144 in order to bias the positionable shutter assembly 140 to the closed position (FIG. 4A). The spring element 152 may be any shape capable of biasing the positionable shutter assembly 140 such as, for example, elongate, helical, conical, bowed, cantilevered and the like. Thus, while the spring element 152 is depicted in FIGS. 4A and 4B as being substantially arch-shaped spring element disposed between the receptacle housing 110 and the positionable shutter assembly 140, the spring element 152 may be any shape suitable for biasing the positionable shutter assembly 140. Additionally, it is noted that, while the optical receptacle 100 is depicted in FIGS. 4A and 4B as having two spring elements 152 that are integral with the receptacle housing 110, the embodiments described herein may comprise any number of spring elements which may be integral with or separate elements coupled to the receptacle housing 110. Furthermore, it is noted that the positionable shutter assembly 140 may comprise any rigid material such as, for example, metal, plastic and the like.

The coupling member 142 may be pivotally engaged with the receptacle housing 110 such that the positionable shutter assembly 140 is rotatable between the closed position (FIG. 4A) and the open position (FIG. 4B). Specifically, the receptacle housing may comprise a rotation aperture 119 which surrounds and engages a protrusion of the coupling member 142. The engagement between the rotation aperture 119 and the coupling member 142 allows the positionable shutter assembly 140 to rotate between the closed position (FIG. 4A) and the open position (FIG. 4B). For example, a corresponding optical connector 170 (FIG. 2B) may be urged through the connector port 118 and into the receptacle pathway 116. When the corresponding optical connector 170 comes into contact with the connector engagement portion 144, the spring element 152 resists the motion of the corresponding optical connector 170. The resistance may be overcome by elastically deforming the spring element 152 by forcing the corresponding optical connector 170 further within the receptacle pathway 116. As the spring element 152 is deformed, the positionable shutter assembly 140 is rotated and the cleaning member 148 cleans the optical waveguide.

Figure 2B:
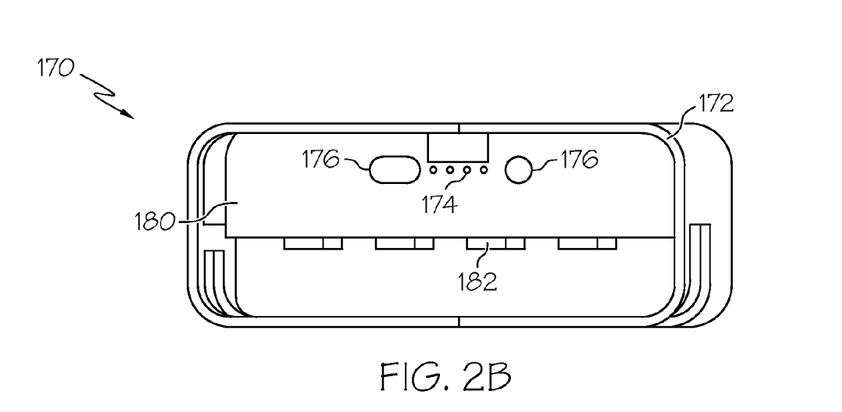
FIG. 2B schematically depicts a corresponding optical connector according to one or more embodiments shown and described herein.

Referring collectively to FIGS. 2A and 2B, an optical connection system comprises an optical receptacle 100 and a corresponding optical connector 170 which cooperate to facilitate optical communication. In one embodiment of the system, the corresponding optical connector 170 comprises an optical connector housing 172 and a connector optical path 174 terminating within the optical connector housing 172. The receptacle optical path 132 and the connector optical path 174 may be placed in optical communication when the corresponding optical connector 170 is positioned in the receptacle pathway 116.

Prior to placing the receptacle optical path 132 and the connector optical path 174 in optical communication, the corresponding optical connector 170 may actuate the positionable shutter assembly 140 from a closed position to an open position (FIG. 2A) to clean an optical waveguide positioned in the receptacle optical path 132. For example, the positionable shutter assembly 140 may be biased to the closed position such that, when the corresponding optical connector 170 is not positioned in the receptacle pathway 116, the cleaning member 148 (not depicted in FIGS. 2A and 2B) contacts or is proximate to the optical waveguide. It is noted that the term "proximate" as used herein means that the cleaning member 148 is positioned such that it does not contact the optical waveguide and is near enough to the optical waveguide such that the cleaning member 148 may contact the optical waveguide when moved, i.e., during a transition from the closed position to the open position.

When the optical connector housing 172 engages the positionable shutter assembly 140, the positionable shutter assembly 140 is biased by the optical connector housing 172 to an open position such that the cleaning member 148 is not positioned over the receptacle optical path 132. Thus, as the receptacle optical path 132 and the connector optical path 174 are being aligned with one another, the positionable shutter assembly 140 transitions from a closed position to an open position. Simultaneous to the transition, the cleaning member 148 slides across a surface of the optical waveguide to remove dirt from the optical waveguide. In one embodiment, the cleaning member is coupled to a support surface 150 that is substantially rigid, i.e., the support surface 150 maintains a substantially constant shape that resists deflection and deformation as the cleaning member 148 is slid across a surface of the optical waveguide. In further embodiments, the support surface 150 is flexible.

Still referring to FIGS. 2A and 2B, the optical receptacle 100 may comprise a support body 120 disposed within the receptacle housing 110 and coupled to an inner surface 112 of the receptacle housing 110. The optical receptacle 100 may further comprise a mating wall 130 disposed within the receptacle housing 110 and spaced apart from the connector port 118. In one embodiment, the mating wall 130 is non-parallel with respect to the support body 120. In another embodiment, the support surface 150 of the positionable shutter assembly 140 is non-parallel with respect to the support body 120 and spaced apart from the mating wall 130.

The support body 120 may comprise at least one electrical trace 122 that mates with a corresponding electrical trace 182 of the corresponding optical connector 170. For example, an electrical trace 122 may be placed in electrical communication with the corresponding electrical trace 182 when the corresponding optical connector 170 is inserted into the optical receptacle 100. As used herein the term "electrical communication" means that the components are capable of transmitting electrical or electromagnetic signals with one another via a conductive medium such as for example, terminal blocks, posts, solder joints, integrated circuit traces, wires, and the like.

In order to facilitate optical and electrical communication, the mating wall 130 may comprise a receptacle alignment member 136 and the corresponding optical connector 170 may comprise an optical connector alignment member 176 disposed within the optical connector housing 172. For example, the receptacle alignment member 136 and the optical connector alignment member 176 may be concentrically shaped such that the receptacle alignment member 136 and the optical connector alignment member 176 can be mated when the corresponding optical connector 170 is positioned in the receptacle pathway 116. Specifically, the receptacle alignment member 136 may be a recess with a circular cross-section while the optical connector alignment member 176 may be a protrusion with a circular cross-section. It is noted that, while the receptacle alignment member 136 and the optical connector alignment member 176 are depicted in FIGS. 2A and 2B as comprising a circular or an oval-shaped cross-section, the receptacle alignment member 136 and the optical connector alignment member 176 may comprise any cross-section that facilitates alignment of the optical receptacle 100 and the corresponding optical connector 170 such as, for example, rectangular, square, polygonal, and the like. Furthermore, it is noted that, while two receptacle alignment members 136 and two optical connector alignment members 176 are depicted in FIGS. 2A and 2B, the embodiments described herein may comprise any number of receptacle alignment members 136 and any number of optical connector alignment members 176.

Figure 5:
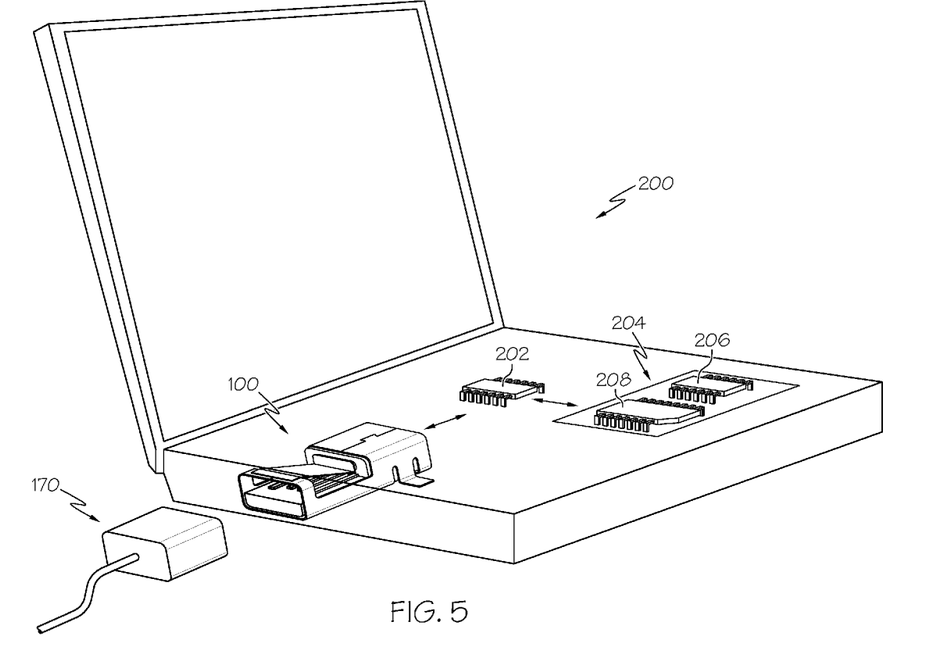
FIG. 5 schematically depicts a consumer electronic device with an optical receptacle according to one or more embodiments shown and described herein.

Referring now to FIG. 5, in one embodiment, a consumer electronic device 200 comprises at least one optical circuit 202 and an optical receptacle 100. The optical circuit 202 exchanges data (generally indicated by double arrowed lines in FIG. 5) between the optical receptacle 100 and device electronics 204 of the consumer electronic device 200. The optical circuit comprises at least one device for electrical-to-optical conversion and/or optical-to-electrical conversion, e.g., an optoelectronic device. The device electronics 204 comprise a memory 206 and a processor 208 that exchange data with the optical circuit 202. The processor 208 may be an integrated circuit, a microchip, a computer, or any other computing device capable of executing machine readable instructions. The processor 208 is communicably coupled to the memory 206. The memory may be RAM, ROM, a flash memory, a hard drive, or any device capable of storing machine readable instructions. In the embodiments described herein, the processor 208 and the memory 206 may be integral with one another, or the processor 208 and the memory 206 may be discrete components communicably coupled with one another. It is noted that, while the consumer electronic device 200 is depicted in FIG. 5 as a notebook computer, the consumer electronic device may be any electrically powered device such as, for example, a computing device, a mobile telecommunication device, a television, an MP3 player and the like.

Figure 6:
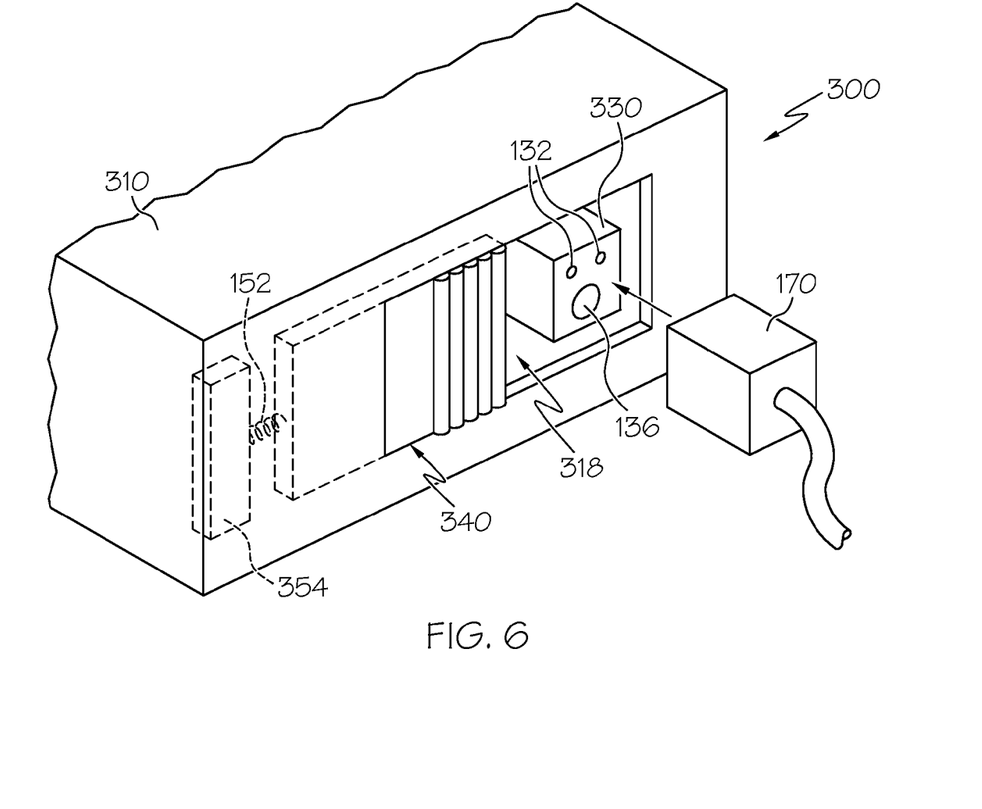
FIG. 6 schematically depicts an optical receptacle with a shutter in an open position according to one or more embodiments shown and described herein.

A further embodiment of an optical receptacle 300 for receiving a corresponding optical connector 170 is depicted in FIG. 6. In this embodiment the optical receptacle 300 comprises a receptacle housing 310, a receptacle optical path 132, and a positionable shutter assembly 340. The receptacle housing 310 comprises a connector port 318 that forms an aperture in the receptacle housing 310. In one embodiment, the receptacle housing 310 is a housing of a consumer electronic device such as, a computer, a camera, a personal music player, a smart phone and the like. The connector port 318 is depicted in FIG. 6 as a rectangular shaped cut-out that frames a rectangular aperture. It is noted that the connector port 318 may be any shape such as, for example, rectangular, square, polygonal, circular, elliptical and the like. Generally, the connector port 318 is shaped to receive and accommodate the corresponding optical connector 170, i.e., the connector port 318 is larger than the corresponding optical connector 170. The receptacle optical path 132 terminates within the receptacle housing 310 and comprises an optical waveguide, as is described above.

Figure 7A:
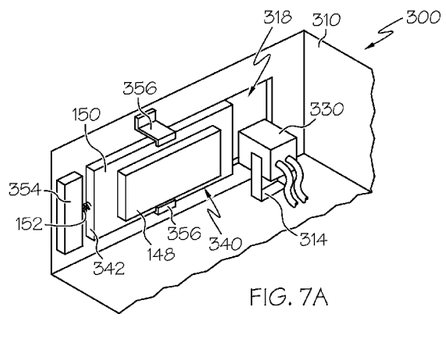
FIG. 7A schematically depicts an optical receptacle with a shutter in an open position according to one or more embodiments shown and described herein.
Figure 7B:
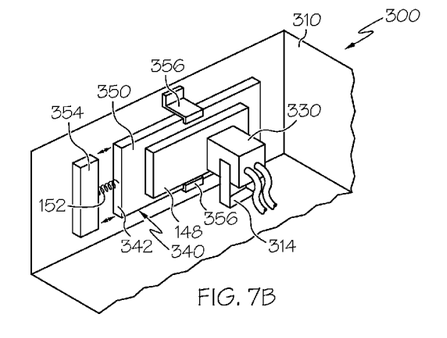
FIG. 7B schematically depicts an optical receptacle with a shutter in a closed position according to one or more embodiments shown and described herein.

Referring collectively to FIGS. 7A and 7B, the positionable shutter assembly 340 moves between an open position (FIG. 7A) and a closed position (FIG. 7B) with respect to the connector port 318. The positionable shutter assembly 340 comprises a cleaning member 148 positioned on a support surface 150 of the positionable shutter assembly 340. The positionable shutter assembly 340 may be biased to the open position, the closed position, or an intermediate position (not depicted) by actuation such as, for example, mechanical actuation, electrical actuation, manual actuation, and the like. In one embodiment, the positionable shutter assembly 340 is biased by manual actuation. Specifically, the positionable shutter assembly 340 may be moved throughout a range of motion by hand (e.g., thumb or finger). The range of motion includes the closed position, the open position and intermediate positions, i.e., transient positions between the closed position and the open position.

Referring to FIG. 7B, when the positionable shutter assembly 340 is biased to the closed position, the cleaning member 148 contacts or is proximate to the optical waveguide. In one embodiment, a portion of the cleaning member 148 touches the optical waveguide when in the closed position. In another embodiment, when in the closed position, the cleaning member 148 is proximate to the optical waveguide. Specifically, the cleaning member 148 is spaced a distance away from the optical waveguide. The distance may be calibrated such that as the positionable shutter assembly 340 is actuated from the closed position, the cleaning member 148 contacts the optical waveguide at an intermediate position. The positionable shutter assembly 340 also covers the connector port 318 when the positionable shutter assembly 340 is biased to the closed position. Specifically, the positionable shutter assembly 340 is mated with the receptacle housing 310, such that the aperture in the receptacle housing 310 framed by the connector port 318 is substantially filled by the positionable shutter assembly 340.

Referring now to FIG. 7A, when the positionable shutter assembly 340 is biased to the open position, the cleaning member 148 is not positioned over the receptacle optical path 132 (FIG. 6). In the open position, the cleaning member 148 may be offset or removed from the receptacle optical path 132. For example, the cleaning member 148 may be offset transversely from the receptacle optical path 132 such that the corresponding optical connector 170 may be mated with the receptacle optical path 132. The positionable shutter assembly 340, when biased to the open position, is adjacent to the connector port 318 such that at least a portion of the connector port 318 is unobstructed. For example, the positionable shutter assembly 340 may be removed or partially removed from the aperture framed by the connector port 318 such that the corresponding optical connector 170 (FIG. 6) may be inserted into the connector port 318.

Referring collectively to FIGS. 6-7B, the optical receptacle 300 may further comprise a spring element 152, as is described above, for biasing the positionable shutter assembly 340 to the closed position. Generally, the spring element 152 has a restorative force created by the elastic nature of the spring element 152, i.e., a restorative force is exerted by the spring element 152 as the spring element 152 is displaced or deformed from an equilibrium state. In one embodiment, the spring element 152 is coupled to a spring engagement portion 342 of the positionable shutter assembly 340. The positionable shutter assembly 340 is biased to the closed position by the spring element 152 such that, as the positionable shutter assembly 340 is actuated away from the closed position, the restorative force of the spring element 152 opposes the actuation. It is noted that, while FIGS. 6-7A depict a helical spring disposed between the spring engagement portion 342 and a spring support member 354, the spring element 152 may be any shape and may be coupled to or integral with the positionable shutter assembly 340, as is described above.

In the embodiment shown in FIGS. 7A and 7B, the optical receptacle 300 comprises a mating body 330 coupled to the receptacle housing 310 for mating with the corresponding optical connector 170. The mating body 330 may be coupled directly to the receptacle housing 310 or may be coupled to the receptacle housing 310 by a connecting member 314, as depicted in the figures. It is noted that, while the connecting member 314 is depicted in FIGS. 7A and 7B as a bracket, the connecting member 314 may be any device coupled to the receptacle housing 310 such as, for example, a bracket, an electrical component or a circuit board. Additionally, while the mating body 330 is depicted in FIGS. 6-7B as being box-shaped, the mating body 330 may be any shape that is suitable for mating with the corresponding optical connector 170. Furthermore, the mating body 330 and the connecting member 314 may be integral with one another. In one embodiment, the receptacle optical path 132 terminates within the mating body 330. For example, the receptacle optical path 132 passes through the mating body 330 such that the optical waveguide is accessible to the corresponding optical connector 170. In another embodiment, a receptacle alignment member 136 is disposed on the mating body 330. The receptacle alignment member 136 may align the corresponding optical connector 170 with the mating body 330, as is described herein.

Referring now to FIGS. 7A and 7B, the optical receptacle 300 may comprise a slide member 356 coupled to the receptacle housing 310 and slidingly engaged with the positionable shutter assembly 340. The slide member 356 is depicted in FIGS. 7A and 7B as bracket coupled to the receptacle housing 310. It is noted that the slide member may be any device that facilitates translational motion of the positionable shutter assembly 340 with respect to the connector port 318 such as, for example, a bearing, a track and the like. Therefore, according to the embodiments described herein, the slide member 356 may be integral with or coupled to the receptacle housing 310 and/or the positionable shutter assembly 340. For example, as shown in FIG. 7B, the slide member 356 is coupled to the connector port 318. The positionable shutter assembly 340 may slide axially (generally indicated in FIG. 7B by double arrowed lines) between the closed position and the open position. Specifically, the motion of the positionable shutter assembly 340 is constrained by the slide member 356 such that the positionable shutter assembly 340 moves throughout intermediate positions with respect to the connector port 318.

Referring again to FIG. 6, according to the embodiments described herein, the positionable shutter assembly 340 may comprise a tactile portion 346. The tactile portion 346 is configured to facilitate manual actuation of the positionable shutter assembly 340. While the tactile portion 346 is depicted in FIG. 6 as being a ridged region of the positionable shutter assembly 340, the tactile portion 346 may be any type of friction enhancing and/or ergonomic feature of the positionable shutter assembly adapted for receiving a manual force such as, for example, a coating, an attachment, an integrated feature and their equivalents.

It should now be understood that the optical receptacles and optical connection systems described herein utilize a positionable shutter assembly with a cleaning member to clean an optical waveguide during a mating process. For example, a consumer electronic device such as, for example, a cellular telephone may comprise an optical receptacle, as is described in further detail above. An optical waveguide positioned within a receptacle pathway of the consumer electronic device may be cleaned by inserting a corresponding optical connector into the optical receptacle. The efficiency of data transfer between the consumer electronic device and the corresponding optical connector may be improved by providing a periodically cleaned optical waveguide. Additionally, it is noted that the embodiments described herein relate to optical receptacles comprising a positionable shutter assembly and/or optical connectors comprising a positionable shutter assembly. Thus, a shutter can be implemented on the connector side (plug side) or receptacle side of a connection.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical receptacle for receiving a corresponding optical connector, the optical receptacle comprising:
a receptacle housing comprising a connector port disposed at an end of the receptacle housing and a receptacle pathway disposed between the end of the receptacle housing and a mating wall, wherein the connector port receives the corresponding optical connector;
an optical waveguide disposed at the mating wall defining a receptacle optical path within the receptacle housing;
a positionable shutter assembly extending from the end of the receptacle housing having the connector port towards the mating wall, the positionable shutter assembly having a closed position and an open position with respect to the receptacle optical path, and comprising a cleaning member positioned on a support surface of the positionable shutter assembly, wherein:
when the corresponding optical connector is not positioned in the receptacle pathway, the positionable shutter assembly is biased to the closed position such that the cleaning member contacts or is proximate to the optical waveguide and the positionable shutter assembly is disposed in the receptacle pathway; and
when the corresponding optical connector is positioned in the receptacle pathway, the positionable shutter assembly is biased to the open position such that the cleaning member is not positioned within the receptacle optical path.

2. The optical receptacle of claim 1, wherein the positionable shutter assembly comprises a coupling member coupled to an outer surface of the receptacle housing, a connector engagement portion extending from the coupling member, and a shutter portion extending from the connector engagement portion, the shutter portion comprising the support surface, wherein the support surface is substantially planar.

3. The optical receptacle of claim 2, wherein the coupling member is pivotally engaged with the receptacle housing and the positionable shutter assembly is rotatable between the closed position and the open position.

4. The optical receptacle of claim 2, wherein the coupling member is welded to the outer surface of the receptacle housing and the positionable shutter assembly elastically deforms between the closed position and the open position.

5. The optical receptacle of claim 1, wherein the cleaning member comprises a fibrous material.

6. The optical receptacle of claim 1, wherein the cleaning member is removably received on the support surface.

7. The optical receptacle of claim 1, further comprising an active element disposed within the receptacle housing.

8. An optical connection system comprising an optical receptacle and a corresponding optical connector, wherein:
the optical receptacle comprises a receptacle housing, an optical waveguide defining a receptacle optical path, and a positionable shutter assembly, wherein:
the receptacle housing comprises a connector port disposed at an end of the receptacle housing and a receptacle pathway disposed between the end of the receptacle housing and a mating wall, wherein, the connector port receives the corresponding optical connector;
the receptacle optical path terminates within the receptacle housing at the mating wall;
the positionable shutter assembly extends from the end of the receptacle housing having the connector port towards the mating wall and comprises a cleaning member positioned on a support surface of the positionable shutter assembly;
the corresponding optical connector comprises an optical connector housing and a connector optical path, wherein:
when the corresponding optical connector is not positioned in the receptacle pathway, the positionable shutter assembly is biased to a closed position such that the cleaning member contacts or is proximate to the optical waveguide; and
when the corresponding optical connector is positioned in the receptacle pathway, the receptacle optical path and the connector optical path are in optical communication and the optical connector housing is engaged with the positionable shutter assembly such that the positionable shutter assembly is biased to an open position and the cleaning member is not positioned within the receptacle optical path.

9. The optical connection system of claim 8, wherein the optical receptacle comprises a support body disposed within the receptacle housing and coupled to an inner surface of the receptacle housing.

10. The optical connection system of claim 9, wherein the mating wall is non-parallel with respect to the support body.

11. The optical connection system of claim 10, wherein the support body comprises at least one electrical trace mating with a corresponding electrical trace of the corresponding optical connector.

12. The optical connection system of claim 10, wherein:
the mating wall comprises a receptacle alignment member;
the corresponding optical connector comprises an optical connector alignment member disposed within the optical connector housing; and
the receptacle alignment member and the optical connector alignment member are mated when the corresponding optical connector is positioned in the receptacle pathway.

13. The optical connection system of claim 10, wherein the support surface of the positionable shutter assembly is non-parallel with respect to the support body, spaced apart from the mating wall, and substantially rigid.

14. A consumer electronic device comprising a housing containing at least one optical circuit and an optical receptacle disposed within the housing, the optical receptacle comprising:
a receptacle housing comprising a connector port disposed at an end of the receptacle housing, and a receptacle pathway disposed between the end of the receptacle housing and a mating wall, wherein the connector port receives a corresponding optical connector;
an optical waveguide optically coupled to the at least one optical circuit, the optical waveguide defining a receptacle optical path within the receptacle housing and disposed at the mating wall;
a positionable shutter assembly extending from the end of the receptacle housing having the connector port towards the mating wall, the positionable shutter assembly having a closed position and an open position with respect to the receptacle optical path and comprising a cleaning member positioned on a support surface of the positionable shutter assembly, wherein:
when the corresponding optical connector is not positioned in the receptacle pathway, the positionable shutter assembly is biased to the closed position such that the cleaning member contacts or is proximate to the optical waveguide; and when the corresponding optical connector is positioned in the receptacle pathway, the positionable shutter assembly is biased to the open position such that the cleaning member is not positioned within the receptacle optical path.

15. The consumer electronic device of claim 14, wherein the positionable shutter assembly comprises a coupling member coupled to an outer surface of the receptacle housing, a connector engagement portion extending from the coupling member, a shutter portion extending from the connector engagement portion, and comprising the support surface, wherein:

when the positionable shutter assembly is in the closed position, the connector engagement portion of the positionable shutter assembly at least partially obstructs the receptacle pathway; and when the positionable shutter assembly is biased to the open position, the corresponding optical connector is engaged with the connector engagement portion of the positionable shutter assembly such that the connector engagement portion of the positionable shutter assembly is displaced toward an inner surface of the receptacle housing.

16. The consumer electronic device of claim 14, wherein the consumer electronic device is a computing device, a mobile telecommunication device, or a television.

\* \* \* \* \*